(12) United States Patent
Kandoria

(10) Patent No.: US 12,612,177 B2
(45) Date of Patent: Apr. 28, 2026

---

(54) REAL-TIME ERROR MONITOR OF RECEIVER AIRCRAFT BASED ON MACHINE LEARNING KEYPOINT SOLUTIONS FOR AUTOMATED AERIAL REFUELING

(71) Applicant: The Boeing Company, Arlington, VA (US)

(72) Inventor: Balram Kandoria, Lynnwood, WA (US)

(73) Assignee: The Boeing Company, Arlington, VA (US)

( * ) Notice: Subject to any disclaimer, the term of this patent is extended or adjusted under 35 U.S.C. 154(b) by 59 days.

(21) Appl. No.: 18/643,534

(22) Filed: Apr. 23, 2024

(65) Prior Publication Data

US 2025/0326496 A1 Oct. 23, 2025

(51) Int. Cl.
    B64D 39/00 (2006.01)
    G06T 7/00 (2017.01)
    (Continued)

(52) U.S. Cl.
    CPC ................ B64D 39/00 (2013.01); G06T 7/75 (2017.01); G06V 10/62 (2022.01); G06V 10/70 (2022.01);
    (Continued)

(58) Field of Classification Search
    CPC . B64D 39/00; G06T 7/75; G06T 2207/10028; G06T 2207/30252; G06V 10/70; G06V 10/62; G06V 20/56
    (Continued)

(56) References Cited

U.S. PATENT DOCUMENTS 6,966,525 B1 11/2005 Schroeder
7,980,512 B1 7/2011 Speer et al.
(Continued)

FOREIGN PATENT DOCUMENTS

EP 4024346 A1 7/2022
WO 2020108037 A1 6/2020

OTHER PUBLICATIONS

Tapas Dutta, "Object Keypoint Similarity in Keypoint Detection," Aug. 15, 2023, LearnOpenCV by BigVision, whole document. (Year: 2023).*

(Continued)

*Primary Examiner* — Tiffany P Young
(74) *Attorney, Agent, or Firm* — Harrity & Harrity, LLP

(57) ABSTRACT

A method of operating an aerial refueling aircraft includes an aircraft controller receiving a time-series of images of a receiver aircraft from an aircraft camera system and, using these images, determines an aircraft type and predefined keypoint locations for the receiver aircraft. Using a position estimation machine learning algorithm, the controller modifies each aircraft image to place keypoints at the aircraft keypoints on the receiver aircraft. The controller determines a rate of change for each keypoint in each image and, using these keypoint rates of change, predicts keypoint locations for the keypoints in each image. The controller determines a system confidence value by comparing the keypoints in each image with its corresponding predicted keypoint location. Responsive to determining that the system confidence value exceeds a threshold confidence value, the controller controls movement of the aircraft's refueling boom in accordance with a predefined boom control protocol.

20 Claims, 4 Drawing Sheets

(51) Int. Cl.

| | |
|---|---|
| *G06T 7/73* | (2017.01) |
| *G06V 10/62* | (2022.01) |
| *G06V 10/70* | (2022.01) |
| *G06V 20/56* | (2022.01) |

(52) U.S. Cl.
CPC .... *G06V 20/56* (2022.01); *G06T 2207/10028* (2013.01); *G06T 2207/30252* (2013.01)

(58) Field of Classification Search
USPC .......................................................... 701/36
See application file for complete search history.

(56) References Cited

U.S. PATENT DOCUMENTS

| | | | |
|---|---|---|---|
| 9,150,310 | B1 | 10/2015 | Bray et al. |
| 2008/0250423 | A1 | 10/2008 | Bush et al. |
| 2014/0042274 | A1 | 2/2014 | Hatcher et al. |
| 2018/0150718 | A1* | 5/2018 | Omari .................. G01C 21/005 |
| 2021/0163148 | A1 | 6/2021 | Bosma |
| 2022/0212811 | A1* | 7/2022 | Khosla .................. G06V 10/46 |
| 2022/0258875 | A1* | 8/2022 | Kyono .................. G06V 20/56 |
| 2022/0306311 | A1* | 9/2022 | Kyono ...................... G06T 7/11 |
| 2023/0026394 | A1 | 1/2023 | Rock et al. |
| 2023/0031289 | A1* | 2/2023 | Chen ...................... G06V 20/56 |
| 2023/0202670 | A1 | 6/2023 | Bosma |
| 2023/0215041 | A1 | 7/2023 | Nguyen et al. |
| 2024/0034491 | A1 | 2/2024 | Hiller et al. |

OTHER PUBLICATIONS

Extended European Search Report for European Application No. EP25169475.8 dated Jul. 23, 2025, 6 pages.

* cited by examiner

REAL-TIME ERROR MONITOR OF RECEIVER AIRCRAFT BASED ON MACHINE LEARNING KEYPOINT SOLUTIONS FOR AUTOMATED AERIAL REFUELING

TECHNICAL FIELD

The present disclosure relates generally to aerial refueling aircraft. More specifically, aspects of this disclosure relate to intelligent aircraft control systems and logic for automated air-to-air refueling (A3R) using enhanced computer-based vision systems.

BACKGROUND

Aerial refueling-colloquially referred to as "air-to-air refueling"—has traditionally been performed by a trained aerial refueling operator who manually operates a refueling boom while positioned behind a window in the tail of the tanker aircraft with a view of the boom and a to-be-refueled receiver aircraft. Many modern aerial refueling tanker aircraft are now equipped with computer-based vision systems to aid the aerial refueling operator in mating the refueling boom with a receiver port on the receiver aircraft. Some available vision systems use real-time imaging with multiple cameras that cooperatively generate a three-dimensional (3D) view of the receiver aircraft that is displayed to the human operator. Many modern tanker aircraft may also use range detection devices to provide supplemental range measurements for the human operator. In order to improve reliability, standardize operations, and reduce costs, tanker aircraft may employ computer-controlled vision systems for automating the air-to-air refueling processes.

SUMMARY

Aspects of this disclosure are directed to intelligent aircraft control systems and memory-stored system control logic for provisioning real-time estimation of aircraft dynamics based on machine-learning (ML) keypoint (KP) solutions for automated air-to-air refueling error monitoring. In an example, a method is presented for operating an aerial refueling aircraft having a refueling boom and a camera system with one or more digital cameras. This representative method includes, in any order and in any combination with any of the above and below disclosed options and features: receiving, e.g., via a resident or remote controller, control module, or network of controllers/modules (collectively "aircraft controller") from the resident aircraft camera system, a time-series of images of a to-be-refueled receiver aircraft (hereinafter "receiver aircraft"); determining, e.g., via the aircraft controller using the time-series of images, an aircraft type (e.g., make, model, trim, year, etc.) of the receiver aircraft and a set of predefined keypoint locations (e.g., physical aircraft features) specific to that aircraft type; detecting, e.g., via the aircraft controller using a position estimation machine learning (ML) algorithm, on each aircraft image, in the time-series of images, keypoints at the keypoints locations on the receiver aircraft in the aircraft image; determining, e.g., via the aircraft controller, a keypoint rate of change for each keypoint in each aircraft image by comparing each of the keypoints to a corresponding keypoint in a prior image immediately preceding the subject image in the time-series of images; estimating, e.g., via the aircraft controller using a KP predictive states model and the keypoint rates of change, a predicted keypoint location for each keypoint in each aircraft image; determining, e.g., via the aircraft controller, a system confidence value by comparing the detected keypoints in each aircraft image with the predicted keypoint locations corresponding to that aircraft image; and commanding, e.g., via the aircraft controller in response to a determination that the system confidence value is greater than a threshold confidence value, movement of the refueling boom in accordance with a predefined boom control protocol.

Additional aspects of this disclosure are directed to aircraft equipped with intelligent aircraft control systems and closed-loop control logic for provisioning real-time aircraft dynamics estimation and real-time A3R error monitoring. As used herein, the terms "aircraft" and "vehicle", including permutations thereof, may be used interchangeably and synonymously to include any relevant vehicle platform, such as fixed-wing aircraft, rotary-wing aircraft, unmanned aerial vehicles (UAV), vertical takeoff and landing (VTOL) aircraft, spacecraft, etc., including manned, unmanned, and fully or partially autonomous variants thereof. In an example, an aircraft includes a load-bearing airframe with landing gear, rotor assemblies and/or wings mounted to the airframe, optional propulsion and guidance systems, and other standard original equipment. The aircraft is also equipped with a resident camera system, which includes one or more digital cameras attached to the airframe, and a refueling system, which includes a fuel tank and a controller-automated refueling boom attached to the airframe.

Continuing with the discussion of the foregoing example, the aircraft also includes an aircraft controller that is communicatively connected to the camera system and the refueling system. The aircraft controller is programmed to receive a time-series of images of a receiver aircraft from the camera system and, using the received images, determine an aircraft type with a corresponding set of aircraft keypoints for the receiver aircraft. Using a position estimation ML algorithm, the aircraft controller detects, on each image in the time-series of images, positions of keypoints at predefined features on the receiver aircraft in the image. The controller then determines a respective keypoint rate of change for in the entire set of keypoints associated with each image. It does this by comparing each keypoint in the image to a corresponding keypoint in an image prior in the time-series. Using these keypoint rates of change, the aircraft controller estimates a predicted keypoint location for each keypoint in the subsequent image and determines a system confidence value by comparing the detected and predicted keypoint locations corresponding to that aircraft image. Upon determining that the system confidence value exceeds a threshold confidence value, the aircraft controller immediately directs movement of the refueling boom in accordance with a predefined boom control protocol.

Aspects of this disclosure are also directed to computer-readable media (CRM) containing controller-executable instructions for provisioning real-time aircraft dynamics estimation and real-time A3R error monitoring. In an example, a non-transient CRM stores instructions that are executable by one or more processors of an aircraft controller of an aerial refueling aircraft. The aerial refueling aircraft is equipped with a refueling system, which includes a movable refueling boom, and a camera system, which includes one or more digital cameras. The CRM-stored instructions, when executed by the processor(s), cause the aircraft controller to perform operations, including: receiving, from the camera system, a time-series of images of a receiver aircraft; determining, using the time-series of images, an aircraft type of the receiver aircraft and predefined keypoint locations corresponding to the aircraft type; detecting, on each aircraft image in the time-series of images using a position estimation machine learning (ML) algorithm, keypoints at the predefined keypoint locations on the receiver aircraft in the aircraft image; determining keypoint rates of change for the entire set of keypoints in each image by comparing each set of the keypoints to a corresponding set of keypoints in a prior image immediately preceding the current image in the time-series; estimating, using the keypoint rates of change, predicted keypoint locations for the keypoints in each of the aircraft images; determining, via the aircraft controller, a system confidence value by comparing the detected keypoints in each of the aircraft images with the predicted keypoint locations corresponding to the aircraft image; determining if the system confidence value is greater than a threshold confidence value; and commanding, in response to determining the system confidence value, movement of the refueling boom in accordance with a predefined boom control protocol.

For any of the disclosed systems, methods, CRM, and aircraft, the aircraft controller may automatically respond to a determination that the system confidence value is not greater than the threshold confidence value by commanding movement of the refueling boom to a stowed state. As another option, detecting, on an aircraft image, keypoints may include generating the keypoints in a two-dimensional (2D) pixel space. In this instance, the aircraft controller may use a Perspective-and-Point (PnP) iterative model to convert the keypoints in the 2D pixel space to a set of three-dimensional (3D) keypoints in a 3D coordinate space that is mapped onto a 3D model of the receiver aircraft. In particular, PnP may be used to generate the 6DoF (roll, pitch, yaw, x,y,z) of the aircraft; a reprojection may then be used to find the estimated 3D coordinates of each of the 2D keypoints. Locating keypoints may not be optional; rather, keypoint estimation and location in PnP may need to happen before a confidence threshold can be computed. In some applications, each set of predefined keypoint locations is unique to a specific type of receiver aircraft, and may include an aircraft engine keypoint, an aircraft nose cone keypoint, an aircraft fuel port, etc.

For any of the disclosed systems, methods, CRM, and aircraft, the aircraft controller may also determine a set of six-degrees-of-freedom (6DoF) values for each aircraft image using the PnP to generate roll, pitch, yaw, and x, y, and z positions. In particular, the 6DoF may contain a roll angle, a pitch angle, a yaw angle, an x position, a y position, and a z position; the temporal aspect between images may be used to derive velocity and acceleration values. Moreover, the aircraft controller may also determine an aircraft-calibrated flight envelope corresponding to the aircraft type of the receiver aircraft, wherein the flight envelope includes predefined maximum velocity and acceleration values. The estimated velocity and acceleration values may be compared to the predefined maximum velocity and acceleration values to determine if the set of 6DoF values are within the aircraft-calibrated flight envelope. Upon determining that the 6DoF values are not within the flight envelope, the aircraft controller may responsively command movement of the refueling boom to a stowed state.

For any of the disclosed systems, methods, CRM, and aircraft, the aircraft controller may use a PnP iterative model to label each keypoint in each aircraft image as either an inlier or an outlier. A keypoint may be labelled as an outlier if, based on a best fit analysis, that keypoint has a worse fit to a 3D model of the receiver aircraft than the fits of other ones of the keypoints. In at least some implementations, only inlier keypoints are used for conducting a rate determination. As another option, determining a respective keypoint rate of change for a keypoint in an aircraft image may include determining a temporal offset between the aircraft images in the time-series of images and, using this temporal offset, determining a respective velocity and acceleration for each keypoint in each of the aircraft images. As a further option, estimating a predicted keypoint location for a keypoint in an aircraft image may include identifying, for each keypoint, a corresponding keypoint in a prior image immediately preceding that aircraft image in the time-series of images and, using a kinematic displacement equation, calculating the predicted keypoint location for the keypoint in the aircraft image as a function of the respective keypoint rate of change and the corresponding prior keypoint. For a rate of change determination:

Given:

Feature 1 location (Frame N)–$(x_1, y_1)$.

Feature 1 location (Frame N+1)–$(x_2, y_2)$ $$\text{Rate of Change in } x \text{ direction} = \frac{x_2 - x_1}{\Delta t}$$

$$\text{Rate of Change in } y \text{ direction} = \frac{y_2 - y_1}{\Delta t}$$

Incorporating other frames may require averaging the velocity:

Given:

'x' velocity (Frame N)–$v_1$

'x' velocity (Frame N–1)–$v_2$

'x' velocity (Frame N–2)–$v_3$ $$Avg. \ x \ \text{velocity} = \frac{v_1 + v_2 + v_3}{\text{Number of Frames}}$$

For any of the disclosed systems, methods, CRM, and aircraft, determining a system confidence value may include calculating an object keypoint similarity (OKS) as:

$$OKS = e^{-\frac{d_i^2}{2s^2 k_i^2}}$$

where $d_i$ is a Euclidean distance between a temporally predicted keypoint and a KP-predicted keypoint; s is a scalar for an area of a bounding box in the aircraft image divided by a total image area of the aircraft image; and k is a per-keypoint constant that controls fall off. As another option, determining a system confidence value may include calculating both a pixel space error and a cartesian space error.

The above summary does not represent every embodiment or every aspect of this disclosure. Rather, the above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes any and all combinations and subcombinations of the elements and features presented above and below.

Figure 1:
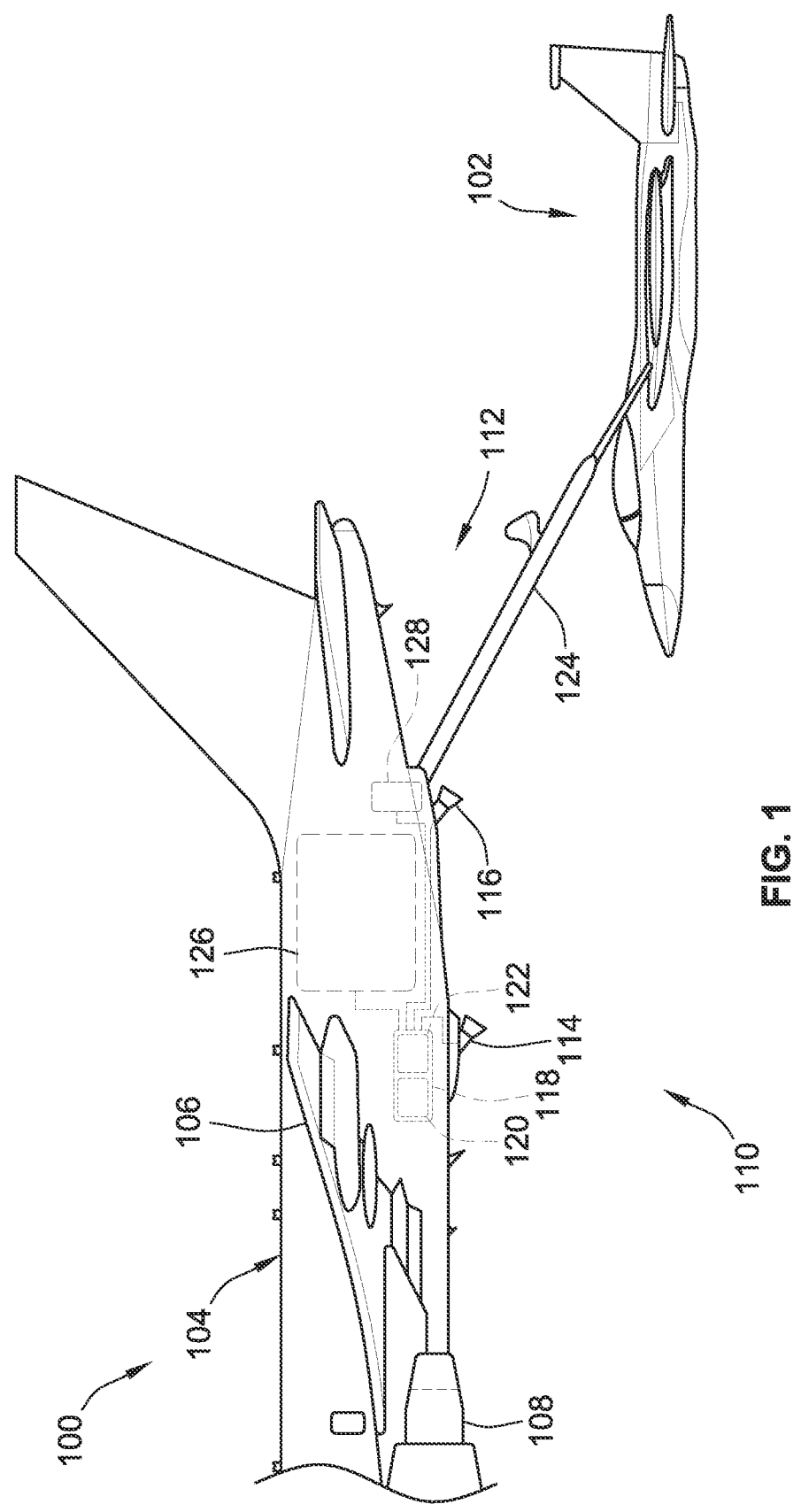
FIG. 1 is a side-view illustration of a portion of a representative aerial refueling aircraft performing an automated air-to-air refueling (A3R) operation for a representative receiver aircraft in accordance with aspects of the present disclosure.

The present disclosure is amenable to various modifications and alternative forms, and some representative embodiments are shown by way of example in the drawings and will be described in detail below. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for example, by the appended claims.

DETAILED DESCRIPTION

This disclosure is susceptible of embodiment in many different forms. Representative examples of the disclosure are shown in the drawings and herein described in detail with the understanding that these embodiments are provided as an exemplification of the disclosed principles, not limitations of the broad aspects of the disclosure. To that end, elements and limitations that are described, for example, in the Abstract, Technical Field, Background, Summary, Description of the Drawings, and Detailed Description sections, but not explicitly set forth in the claims, should not be incorporated into the claims, singly or collectively, by implication, inference or otherwise. Moreover, the drawings discussed herein are not necessarily to scale and are provided purely for instructional purposes. Thus, the specific and relative dimensions shown in the drawings are not to be construed as limiting.

For purposes of the present detailed description, unless specifically disclaimed: the singular includes the plural and vice versa (e.g., indefinite articles "a" and "an" are to be construed as meaning "one or more" unless expressly disclaimed); the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, front, back, left, right, etc., may be with respect to an aircraft that is operatively oriented in an upright position on a horizontal support surface.

Traditional air-to-air refueling operations are heavily reliant on human input and judgment. In order to improve reliability, standardize operations, and reduce cost, a computer-automated, vision-based approach for air-to-air refueling is described herein. In an example, an A3R system processes real-time video camera signals of images containing both a refueling boom and a receiver aircraft, and analyzes these processed images using machine-learned (ML) models to generate a set of real-time directional indicators in a 3D space. The A3R system uses machine-learned models to detect a receiver aircraft and concomitantly estimate the receiver aircraft's position.

A real-time A3R monitor is implemented to help ensure that these ML-based solutions are valid and appropriate in the context of real aircraft dynamics. The A3R monitor may be specifically designed to derive a confidence level for the receiver position estimation ML algorithm. The receiver position estimation ML algorithm—also referred to herein as "Keypoint Detector"-produces a set of points ("keypoints") in two-dimensional image space that corresponds to a set of predetermined physical features on the receiver aircraft ("keypoint locations"). The Keypoint Detector is robustly trained in a variety of different operating conditions to allow the Detector to accurately detect the keypoints on the corresponding physical features of the receiver aircraft. Each type of receiver aircraft may be assigned a unique set of keypoints, which corresponds to unique and differentiable physical features, such as a pitot tube, a window edge, an engine housing inlet, a wing edge, a fuel port, etc.

Once estimated, the keypoints (KP) are fed into a Perspective-and-Point (PnP) algorithm that uses the 2D keypoints and estimates a corresponding 3D position for each keypoint based on predefined 3D geometries of the receiver aircraft. For instance, PnP may estimate a 3D pose of the camera with respect to the aircraft. PnP may be used to generate 6DoF estimates for roll, pitch, yaw, and x, y, z positions of an aircraft. Then a reprojection is used to find the estimated 3D coordinates of each of the 2D keypoints. A Random Sampled Consensus (RANSAC) algorithm, for example, is an iterative PnP method that estimates a mathematical model from a dataset by identifying outliers in the dataset and estimating the desired model using data that does not contain outliers. The RANSAC algorithm may therefore label each input data point as either an inlier or an outlier. A keypoint may be labeled as an outlier if, based on best fit, it has a worse fit to the aircraft's 3D (CAD) model than other keypoints. Receiver position estimation may be used by an aerial refueling aircraft's automatic control laws to produce a series of commands to automate control of the position of the refueling boom. The accuracy of the ML-based solutions may be critical to the completion, efficiency, and safety of the A3R operation between the tanker and receiver aircrafts. Large deviations in calculated receiver position can lead to potentially hazardous conditions and the occurrence of a collision scenario. Building confidence into the output of an ML-based A3R solution is pertinent to mitigating risks of deploying ML-based features with computer-automated, vision-based aerial refueling.

The addition of an ML watchdog helps to provide real-time error and continuity monitoring. For instance, a real-time error monitor may provide an informed measure of the expected position of a receiver aircraft in a given frame in a time-series of images. Armed with a previously estimated position of a receiver aircraft, the error monitor determines if the ML solution is producing reasonable results in a subsequent frame. The monitor employs the physics of the receiver aircraft, e.g., as indicated by Displacement Equation E1 below:

$$x_f = x_o + v_o t + \frac{1}{2} a t^2 \qquad \text{(E1)}$$

where $x_f$ is a predicted next keypoint position, $x_0$ is a determined current keypoint position, $v_0$ is a current velocity of the receiver aircraft, t is a time interval, and a is a current acceleration of the aircraft. The error monitor uses these calculations to determine if the ML solution: (1) indicates the receiver aircraft is flying within the aircraft's corresponding flight envelope, and (2) is sufficiently accurate to lend confidence to the use of keypoint locations in downstream control laws. It should be appreciated that the monitor is not per se limited to monitoring an ML solution and may be similarly applicable to non-ML solutions (e.g., trajectory monitor may not "care" if solution is ML or not).

The monitor may use image frame data that is first passed through an ML Keypoint Detector; the images, each with detected keypoints, are compared to each other in a temporal fashion to generate rates of change in pixel space. These rates are then inputted to the ML watchdog, in which they are used to ascertain continuity as well as to ensure receiver physical dynamics are within defined bounds. In this instance, physical dynamics are not determined from the pixel space itself; rather, 2D key points may be converted to their 3D counterparts, e.g., via PnP RANSAC then reprojection, and then the physical dynamics are ascertained. The determination of physical dynamics of the receiver aircraft may be based on a set of six-degrees-of-freedom (6DoF) values output by the PnP iterative model, whereas keypoint data may be gathered directly from the ML Keypoint Detector. The monitor may use an Object-Keypoint Similarity Equation E2 to determine a keypoint continuity error, as noted below:

$$OKS = e^{-\frac{d_i^2}{2s^2 k_i^2}} \qquad \text{(E2)}$$

where $d_i$ is a Euclidean distance between temporally predicted and KP detector predicted keypoints; s is a scalar for an area of the bounding box divided by the total image area; and k is a per-keypoint constant that controls fall off. Object Keypoint Similarity produces a confidence from 0% to 100% depending on how well the keypoints, collectively, match their temporally predicted positions.

A KP detector with ML watchdog provides a layer of protection against ML solutions that are not physically feasible or are misrepresenting points and, thus, skewing detected receiver position. More so, disclosed approaches may rely on robust training methods and verification of results to ensure the ML solutions are accurate for their operating domains. If desired, a set of boom sensors may be used to determine actual boom position to compare against an ML-generated solution of boom position; however, boom sensors may not be available in all types of A3R systems. The use of a continuity monitor and a real-time error monitor allows the A3R system to vet the solution for consistency and accuracy, which allows for an additional safeguard against unforeseen model and situational circumstances.

Physics-Based Monitor

A flight envelope, typically referred to as a V-n diagram (speed versus load factor), defines the boundaries in which an aircraft can fly without compromising structural integrity, safety, etc. The flight envelope may contain three primary components: (1) altitude limits, (2) speed limits, and (3) load limits. The dynamics-based portion of the monitor may use receiver aircraft position data output by the RANSAC Perspective-and-Point model to temporally determine receiver aircraft speeds and accelerations. The output of the monitor may include a Boolean True/False indication of whether a receiver is flying within a specified flight envelope. The flight envelope may change based on the position of the receiver aircraft: if the receiver aircraft is out of the disconnect funnel, then the flight envelope used may be a "receiver specific" flight envelope; if the receiver aircraft is within the disconnect funnel, the flight envelope used may be a "boom specific" flight envelope. This helps to ensure that the refueling aircraft can disengage and move the boom to a safe position, for example, when receiver dynamics do not match their expected behavior for a specific flight envelope. In either case, if the receiver aircraft is detected to be flying within a respective flight envelope, the output of the monitor will be true. Use of a flight envelope in this manner helps to provide an indication of ML solution validity because it allows for the determination of a feasible solution from a physics standpoint. A receiver aircraft typically cannot fly beyond its flight envelope; as such, if the solution indicates that the receiver is flying outside its envelope then a safe response may include stowing the boom and waiting for the receiving aircraft to dynamically settle.

Continuity Monitor

A continuity monitor, in contrast to the physics-based monitor, tackles a specific type of temporal solution: keypoint error. The term "keypoint error" may be typified as an indication of how close a keypoint is to a nominal position. In a training setting, a keypoint error is derived by comparing ML-detected positions to ground-truth positions, where ground-truth represents the true location of keypoints. This monitor may take as an input the temporal rates of change of individual keypoints. These rates are determined by comparing the previous two frames along with the current frame, which allows for the derivation of acceleration and relative velocity for each keypoint. Using predefined kinematics, the monitor derives a likely next keypoint position in a future frame, which is a "temporally predicted keypoint." The OKS algorithm E2 may be used to provide a score of fit between a temporally predicted keypoint position and a KP-detector-detected keypoint position. Once the detected keypoint positions from the future frame are determined, the system may use OKS to calculate a score based on overall fit to a 3D CAD model of the receiver aircraft. The continuity monitor ascertains whether or not the predicted keypoints are indeed feasible. Continuity monitoring is most effective by relying on the receiver aircraft being in a stable configuration when flying, which is a valid assumption of the refueling or boom flight envelope.

Proposed real-time monitors, while not per se limited, may be particularly useful for automated air-to-air refueling because other commercially available monitors are not able to rely on a known state of the receiver aircraft. By establishing that the receiver is flying within certain bounds while refueling and defining the different types of receiver aircraft being refueled, the monitor can determine the operating limits of the aircraft. Likewise, many available types of monitors depend on disparate sensor data, whereas the proposed monitors may be adapted to rely only on derived receiver aircraft operating dynamics. Optional configurations may enable design-time verification to be used at runtime to provide an indication of a nominal error and to provide information to boom control to indicate a risk level of receiver boom collision.

Referring now to the drawings, wherein like reference numbers refer to like features throughout the several views, there is shown in FIG. 1 a representative aerial refueling aircraft, which is designated generally at 100 and portrayed herein for purposes of discussion as a twinjet flying-boom tanker plane. The illustrated aerial refueling aircraft 100— also referred to herein as "tanker plane" or "tanker" for brevity—is merely an exemplary application with which aspects and features of this disclosure may be practiced. In the same vein, utilization of the present concepts for the illustrated vision-based A3R system for refueling the illustrated receiver aircraft 102 should also be appreciated as an exemplary implementation of the concepts disclosed herein. As such, it will be understood that aspects of the present disclosure may be implemented by other vision-based A3R systems, may be utilized for refueling any suitably equipped receiver aircraft, and may be incorporated into any logically relevant type of aerial refueling aircraft. Lastly, only select components of the tanker plane and A3R system have been shown and will be described in additional detail herein. Nevertheless, disclosed aircraft and systems may include numerous additional and alternative features, and other available peripheral hardware, for carrying out the various methods and functions of this disclosure.

FIG. 1 illustrates an automated air-to-air refueling operation in which a tanker plane 100 is refueling a receiver aircraft 102 while both aircraft are actively in flight. Aircraft 100 of FIG. 1 is shown as a twinjet flying-boom tanker plane with a load-bearing airframe 104 having a fixed pair of main wings 106 rigidly attached to airframe 104. Shown in a sweptback, mid-mount wing configuration, the main wings 106 may each be typified as a rigid, airfoil-shaped structure that produces an aerodynamic force, such as lift, drag and/or moment, during propulsion through a fluid. While any of an assortment of available engine types and layouts may be implemented, the aircraft 100 of FIG. 1 employs a wing-mounted, twin-engine layout with a turbofan engine 108 mounted beneath each wing 106. It is envisioned that the aircraft 100 may take on other aircraft types, may employ different wing and engine layouts, and may incorporate any number engines, each of which may be similar to or different from the engine type illustrated herein.

Packaged on the load-bearing airframe 104 of aircraft 100 is a computer-automated, vision-based A3R system 110 and an onboard refueling system 112 for collaboratively executing the aerial refueling operation. In accord with the illustrated example, the A3R system 110 is represented by a networked camera system with one or more high-resolution video cameras 114, a networked sensor array with one or more on-frame sensors 116, and a resident or remote controller, control module, or network of controllers/modules (collectively "aircraft controller") 118. Aircraft controller 118 is an onboard computing device that provides a mixture of services, both individually and through its communication with other networked devices. This controller 118 may be generally composed of one or more processors 120, each of which may be embodied as a discrete microprocessor, an application specific integrated circuit (ASIC), or a dedicated control module. Resident to (as shown) or remote from the aircraft controller 118 is one or more electronic memory devices 122, each of which may take on the form of a CD-ROM, IC device, a solid-state drive (SSD) memory, a hard-disk drive (HDD) memory, flash memory, semiconductor memory (e.g., various types of RAM or ROM), etc. Refueling system 112 is represented in FIG. 1 by a deployable refueling boom 124, a boom control unit 128 for automating movement and operation of the boom 124, and an onboard fuel tank 126 for stowing and dispensing fuel through the boom 124.

In the illustrated arrangement, an autonomous refueling module or refueling operator—resident to or remote from the tanker plane 100—uses the A3R system 110 and aerial refueling system 112 to automate and optimize refueling of the receiver aircraft 102. Video camera(s) 114 may generate one or more real-time or near real-time video data streams for use by the aircraft controller 118 in deriving respective positions of the refueling boom 124 (e.g., a boom tip) and the receiver aircraft 102 (e.g., a fuel receptacle) relative to the aircraft 100. Resident sensor(s) 116, which may be in the nature of light detection and ranging (LiDAR) and/or radio detection and ranging (RADAR) sensing devices, may generate real-time or near real-time sensor data streams for use by the aircraft controller 118 in the active detection, ranging, proximity, and/or tracking data or receiver aircraft. For at least some applications, the vision-based A3R system 110 receives, buffers, preprocesses, fuses and analyzes the video data stream(s) and sensor data stream(s) to provision real-time aircraft dynamics estimation and real-time A3R error monitoring.

Figure 2A:
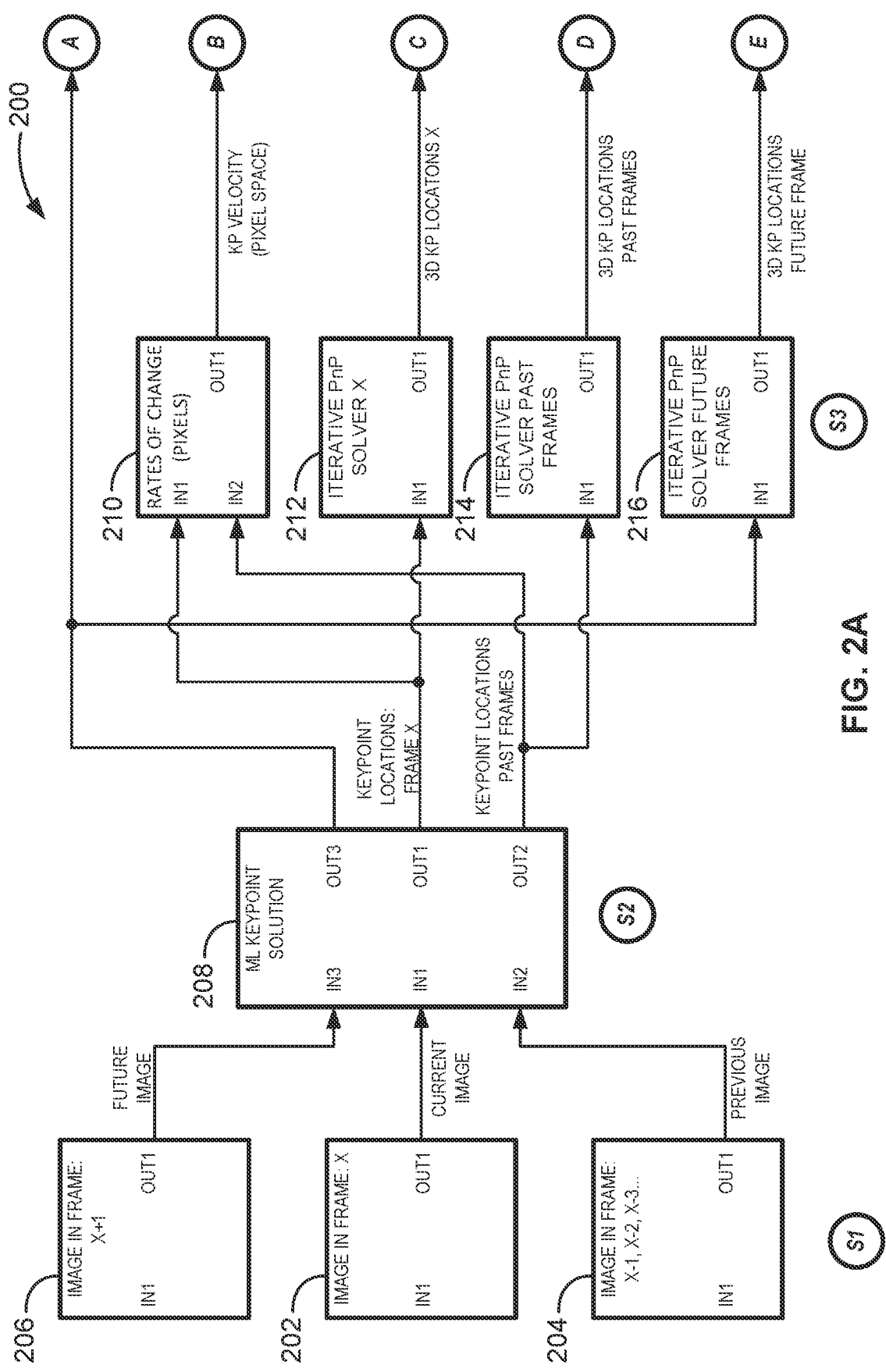
FIGS. 2A and 2B present a schematic diagram of a representative intelligent aircraft control system with attendant system control logic for provisioning real-time aircraft dynamics estimation and real-time A3R error monitoring in accordance with aspects of the present disclosure.
Figure 2B:
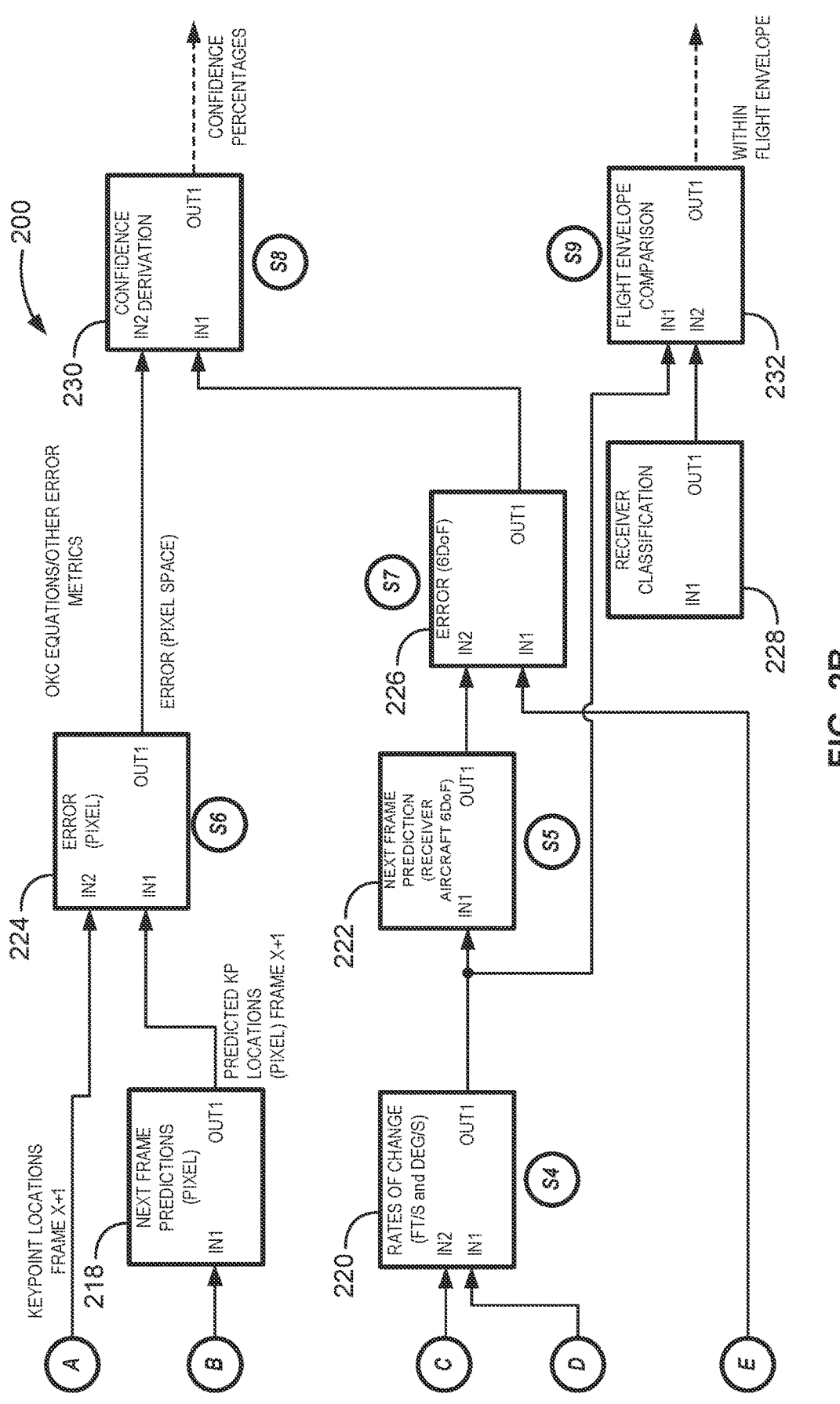

FIGS. 2A and 2B present a schematic diagram of a representative intelligent aircraft control system 200 for provisioning real-time aircraft dynamics estimation and real-time error monitoring for an A3R operation, such as the aerial refueling operation shown in FIG. 1. At a first control step (S1) of FIG. 2A, the aircraft control system 200 receives a time-series of images from a camera system (e.g., video stream data from video camera(s) 114 of FIG. 1). The image from each frame may be loaded and buffered for future analysis; in FIG. 2A, three images are loaded from three particular frames: Current Image 202 in Frame x; Previous Image 204 in Frame x–1 (x–2, x–3, . . . x–N); and Future Image 206 in Frame x+1 (x+2, x+3, . . . x+N), where X is a temporal indicator. At a second control step (S2), the video-extracted images 202, 204, 206 are input into an ML Keypoint Detector 208 to produce a set of points ("keypoints") that corresponds to a set of predetermined physical features on the receiver aircraft ("keypoint locations"). As shown, the ML Keypoint Detector 208 outputs a set of current keypoints for a current frame, one or more sets of past keypoints for one or more past frames, and one or more sets of future keypoints for one or more future frames.

With continuing reference to FIG. 2A, intelligent aircraft control system 200 advances to a third control step (S3) and performs a 2D-to-3D keypoint transformation while also deriving a respective rate of change for each keypoint in each ML-modified image. For the rate of change determination, a Rate of Change module 210 within the control system 200 uses a subject current frame and an immediately preceding prior frame to develop a respective rate of change for each keypoint (pixel/sec). Module 210 may output a keypoint velocity and a keypoint acceleration for each keypoint (e.g., in each image of the receiver aircraft 102 and boom 124 of FIG. 1). For the 2D-to-3D transformation, a 2D "pixel space" set of keypoints is converted into a set of 3D coordinate keypoints. This may be achieved by conducting a best fit transformation of the 2D key points to a 3D computer-aided design (CAD) model of the receiver aircraft using a suitable PnP algorithm and reprojection. In accord with the illustrated example, a 2D-to-3D Transformation Present Frame x module 212 generates a set of 3D KP locations and 6DOF for a present frame, a 2D-to-3D Transformation Past Frames module 214 generates a set of 3D KP locations and 6DOF for one or more prior frames, and a 2D-to-3D Transformation Future Frames module 216 generates a set of 3D KP locations and 6DOF for one or more subsequent frames.

With reference to FIG. 2B, the intelligent aircraft control system 200 advances to a fourth control step (S4) to derive a predicted keypoint location for each keypoint in each aircraft image while also performing a secondary keypoint rate of change determination. A Next Frame Prediction (Pixel) module 218 within the control system 200, for example, receives as inputs the current and prior image keypoint velocity and acceleration (pixel space) values output by the Rate of Change module 210, and then develops a prediction of the pixel location of the set of key points in the next frame, e.g., using written Equation E1. As per the keypoint rate of change determination, a Rates of Change (ft/s) module 220 receives as inputs the 3D KP locations and 6DOF for past and present frames and develops a respective rate of change for each keypoint with object dynamics units (i.e., ft/s) and rate of change for the aircrafts 6DOF axes (i.e., ft/s and deg/s). Module 220 may output a keypoint velocity and a keypoint acceleration for each keypoint in cartesian space and also aircraft velocity and aircraft acceleration; these values for previous and current frames are used to develop the range of change for the roll, pitch, yaw, x, y, z axes for the aircraft and x, y, z axes for keypoints.

Similar to Next Frame Prediction (Pixel) module 218, a Next Frame Prediction (Receiver Aircraft 6DOF) module 222 of the control system 200 receives the aircraft velocity and acceleration values output by module 220 and develops a prediction of roll, pitch, yaw, x, y, and z position for each aircraft image in real cartesian space (ft/deg), as indicated at a fifth control step (S5). Using written Equation E1, module 222 may develop a prediction of roll, pitch, yaw, and x, y, z-position values for a next frame. At a sixth control step (S6), the control system 200 calculates an error (pixel space) value using the outputs from the ML Keypoint Detector 208 and the Next Frame Prediction (Pixel) module 218. When the next (future) frame is received, for example, an Error (Pixel) module 224 compares each Predicted Keypoint Location (Pixel) Frame (x+1) value to a corresponding detected Keypoint Location Future Frame value for one or more future frames in the time-series of images to generate pixel space error values.

At a seventh control step (S7), the control system 200 predicts an error (cartesian space) value using the outputs from the 2D-to-3D Transformation Future Frames module 216 and the Next Frame Prediction (Receiver Aircraft 6DOF) module 222. Using a set of predicted values for roll, pitch, yaw, and x, y, z-positions for a next frame and a set of detected roll, pitch, yaw, and x, y, z-positions for the same next frame, an Error (6DOF) module 226 develops errors for each axis. At the same time, a Receiver Classification module 228 may employ standard classification techniques to identify an aircraft type for the subject receiver aircraft that is in the field-of-view (FOV) of the tanker plane. Advancing to an eighth control step (S8), a Confidence Derivation module 230 uses the outputs of Error (Pixel) module 224 and the Error (6DOF) module 226 as inputs to determine a confidence value (percentage) in the ML system based on industry standard metrics. Since pixel-space errors and cartesian-space errors generally cannot be related to one another, the module 230 may generate a unique confidence value for each error type. At a ninth control step (S9), a Flight Envelope Comparison module 232 receives as inputs an aircraft type and an aircraft-calibrated flight envelope corresponding to the aircraft type of the receiver aircraft from the Receiver Classification module 228, and the keypoint rates of change from the Rates of Change (ft/s) module 220. Module 232 then compares each given rate of change (estimated velocity and acceleration values) to its corresponding parameter in the flight envelope (maximum velocity and acceleration values) to determine if the ML model is producing solutions that are accurate to the dynamics of the receiver and do not indicate rates beyond the receiver aircraft's calibrated physical limitations.

Figure 3:
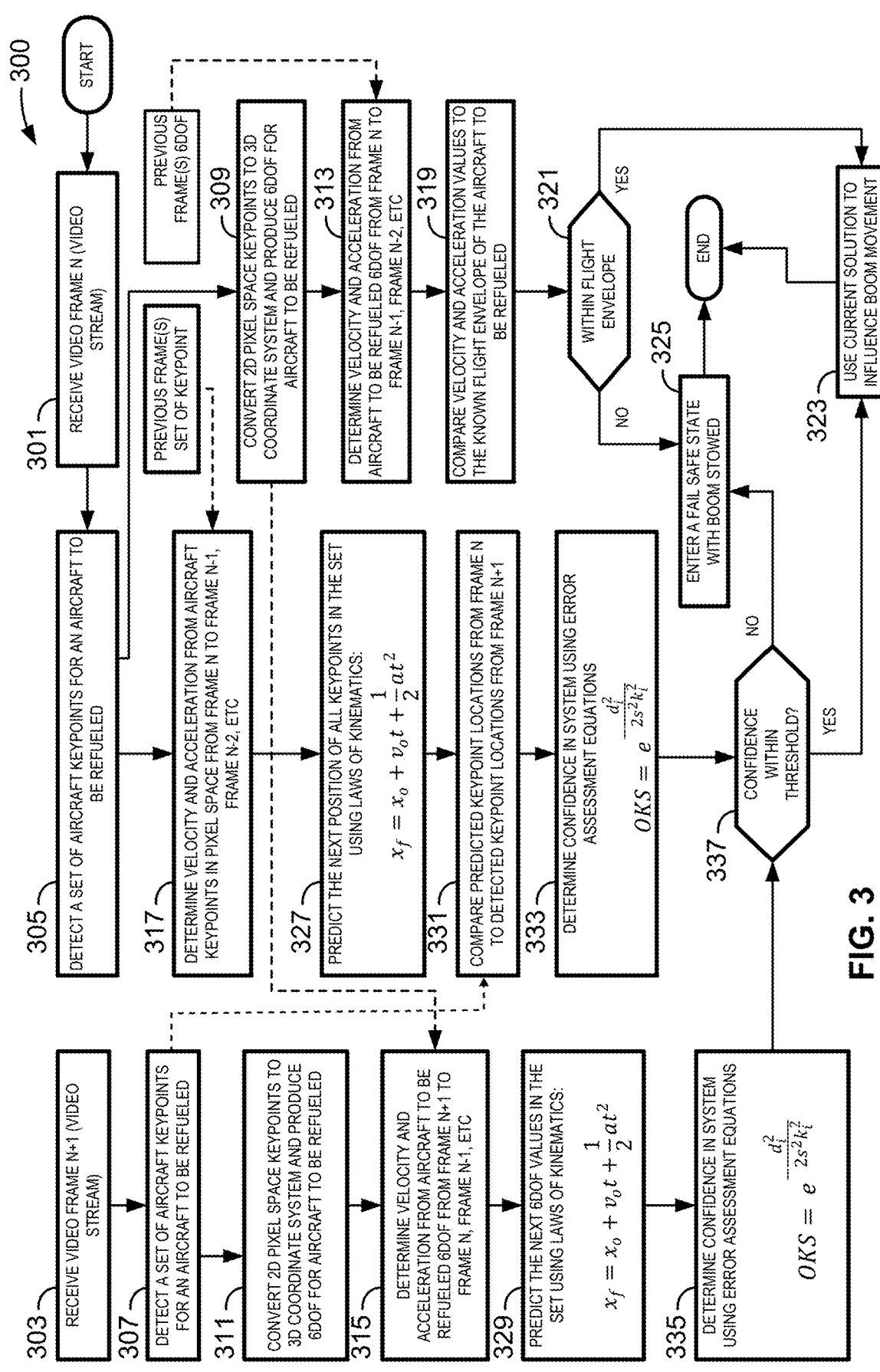
FIG. 3 is a flowchart illustrating a representative aircraft control protocol for provisioning aircraft dynamics estimation and A3R error monitoring, which may correspond to memory-stored instructions that are executable by a resident or remote microcontroller, control-logic circuit, system control module, or other integrated circuit (IC) device or network of circuits/modules/microcontrollers/IC devices (collectively "controller") in accord with aspects of the disclosed concepts.

With reference next to the flow chart of FIG. 3, an improved method or control strategy for provisioning aircraft dynamics estimation and A3R error monitoring for an aerial refueling aircraft, such as tanker plane 100 of FIG. 1, during an aerial refueling operation of a to-be-fueled aircraft, such as receiver aircraft 102, is generally described at 300 in accordance with aspects of the present disclosure. Some or all of the operations illustrated in FIG. 3 and described in further detail below may be representative of an algorithm that corresponds to non-transitory, processor-executable instructions that are stored, for example, in main or auxiliary or remote memory (e.g., resident memory device 122 of FIG. 1), and executed, for example, by an electronic controller, processing unit, dedicated control module, logic circuit, or other module or device or network of controllers/modules/devices (e.g., processor 120 of controller 118 of FIG. 1), to perform any or all of the above and below described functions associated with the disclosed concepts. It should be recognized that the order of execution of the illustrated operation blocks may be changed, additional operation blocks may be added, and some of the herein described operations may be modified, combined, or eliminated. Upon completion of some or all of the control operations presented in FIG. 3, method 300 may advance to END terminal block and temporarily terminate or, optionally, may loop back to START terminal block and run in a continuous loop.

At process block 301, the method 300 receives a current video frame N from a video stream. Likewise, at process block 303, the method 300 receives one or more future video frames N+1, N+2, etc., that follow the current video frame N in the time-series of images in the video stream. Process blocks 301 and/or 303 may also include receiving one or more prior video frames N−1, N−2, etc., that precede the current video frame N in the video stream. Advancing to process block 305, the method 300 detects a set of aircraft keypoints for a to-be-refueled aircraft visible in the current video frame N. Likewise, at process block 307, the method 300 detects a set of aircraft keypoints for the to-be-refueled aircraft imaged in each of the future video frames N+1, N+2, etc. At the same time, the method 300 may detect a set of aircraft keypoints for the to-be-refueled aircraft imaged in each of the prior video frames N−1, N−2, etc. Additional information regarding the identification and mapping of keypoints to physical structures within an image can be found, for example, in U.S. Pat. No. 9,076,195 B2, to Mohammad et al., U.S. Patent App. Pub. No. 2022/0258875 A1, to Kyono et al., U.S. patent application Ser. No. 18/157, 341, to Neighbor et al., and U.S. patent application Ser. No. 18/153,934, to Neighbor et al., all of which are incorporated herein by reference in their respective entireties and for all purposes.

With continuing reference to FIG. 3, the method 300 converts the 2D pixel space keypoints to 3D coordinate system keypoints and produces a set of 6DoF values for the receiver aircraft in the current video frame N, as indicated at process block 309. In the same vein, the method 300 converts the 2D pixel space keypoints to 3D coordinate system keypoints and produces a set of 6DoF values for the receiver aircraft in the future video frames N+1, N+2, etc., as indicated at process block 311. It may be desirable that the method 100 also converts the 2D pixel space keypoints to 3D coordinate system keypoints and produces a set of 6DoF values for the receiver aircraft in the prior video frames N−1, N−2, etc. Producing 6DoF values for a receiver aircraft may be typified by converting the set of 2D key points to a 6DOF description of the receiver, which may be the x, y, z locations of the receiver aircraft's center of pressure and the roll, pitch, and yaw about the center of pressure. As described above, a PnP algorithm is used to convert the 2D keypoints to 6DOF keypoints.

At process block 313, the method 300 determines velocity and acceleration values for the receiver aircraft using the set of 6DoF values for the current video frame N and respective sets of 6DoF values for the prior video frames N−1, N−2, etc. Likewise, the method 300 executes process block 315 to determine velocity and acceleration values for the receiver aircraft using the set of 6DoF values for a future video frame N+1, the set of 6DoF values for the current video frame N, and a respective set of 6DoF values for a prior video frame N−1, etc. The method 300 also determines velocity and acceleration values for the receiver aircraft using the pixel space keypoints for the current video frame N and respective pixel space keypoints for the prior video frames N−1, N−2, etc., as indicated at process block 317.

Method 300 may advance from process block 313 to process block 319 and compare the ML-derived velocity and acceleration values to their corresponding parameters defined in an aircraft-calibrated flight envelope that corresponds to the receiver aircraft. As mentioned above, a flight envelope may be defined via boundaries that are functions of the aircraft's velocity and load limitations to delineate safe and dynamically feasible operating points for the aircraft. At decision block 321, the method 300 determines whether or not the ML-derived flight dynamics of the receiver aircraft are within the receiver's flight envelope. Using the determined velocity of the receiver aircraft, for example, the method 300 is able to determine if the ML solution is detecting the receiver to be flying within its flight envelope. Upon determining that the ML-derived velocity and acceleration values are not within the flight envelope (Block 321=NO), method 300 responsively executes process block 323 and enters a failsafe mode in which the refueling boom is stored and, if desired, temporarily disabled. Conversely, method 300 may respond to a determination that the ML-derived velocity and acceleration values are within the flight envelope (Block 321=YES) by executing process block 325 and using a predefined boom control protocol to govern or automate boom movement. Using a current solution to influence boom movement may indicate that, when the monitor has determined the ML solution is accurate, it will send the refueling receptacle 2D keypoint location to the A3R control function (e.g., Guidance, Navigation, and Control (GNC) algorithms) to maneuver the boom to the receptacle position.

Method 300 of FIG. 3 may advance from process block 317 to process block 327 and predict a respective next position of all keypoints in a current video frame N using a predefined law of kinematics, such as Displacement Equation E1. In a similar regard, process block 329 predicts a respective next set of 6DoF values for the designated video frame using the aforementioned predefined law of kinematics. At process block 331, the method 300 compares the predicted next keypoint positions from video frame N to the detected keypoint positions from video frame N+1. Advancing from process block 331 to process block 333, the method 300 determines a first confidence value in the A3R system using an error assessment equation, such as Object-Keypoint Similarity Equation E2, based on the prediction conducted at process block 327 and the comparison conducted at process block 331. In the same vein, process block 335 determines a second confidence value in the A3R system using an error assessment equation, such as Object-Keypoint Similarity Equation E2, based on the prediction conducted at process block 329.

At decision block 337, the method 300 determines whether or not the first confidence value is within a first predefined threshold confidence value. Upon determining that the first confidence value exceeds the threshold confidence value (Block 337=NO), method 300 responsively executes process block 323 and enters the failsafe mode with the refueling boom stowed. Conversely, method 300 may respond to a determination that the first confidence value is less than or equal to the threshold confidence value (Block 337=YES) by executing process block 325 and using the current boom control solution to control boom movement. At decision block 339, the method 300 determines whether or not the second confidence value is within a second predefined threshold confidence value, which may be the same as or distinct from the first threshold confidence value. Upon determining that the second confidence value exceeds the second threshold confidence value (Block 339=NO), method 300 may responsively execute process block 323. On the other hand, method 300 may respond to a determination that the second confidence value is less than or equal to the second threshold confidence value (Block 337=YES) by executing process block 325.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol, or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used.

Further, the disclosure comprises embodiments according to the following clauses:

Clause 1: a method of operating an aerial refueling aircraft having a refueling boom and a camera system, the method comprising: receiving, via an aircraft controller from the camera system, a time-series of images of a receiver aircraft; determining, via the aircraft controller using the time-series of images, an aircraft type of the receiver aircraft and predefined keypoint locations corresponding to the aircraft type; detecting, on each aircraft image in the time-series of images via the aircraft controller using a position estimation machine learning (ML) algorithm, keypoints at the predefined keypoint locations on the receiver aircraft in the aircraft image; determining, via the aircraft controller, keypoint rates of change for the keypoints in each of the aircraft images by comparing each of the keypoints to a corresponding keypoint in a prior image immediately preceding the aircraft image in the time-series of images; estimating, via the aircraft controller using the keypoint rates of change, predicted keypoint locations for the keypoints in each of the aircraft images; determining, via the aircraft controller, a system confidence value by comparing the keypoints in each of the aircraft images with the predicted keypoint locations corresponding to the aircraft image; and commanding, via the aircraft controller in response to a determination that the system confidence value is greater than a threshold confidence value, movement of the refueling boom in accordance with a predefined boom control protocol.

Clause 2: the method of clause 1, further comprising commanding, via the aircraft controller in response to a determination that the system confidence value is not greater than the threshold confidence value, movement of the refueling boom to a stowed state.

Clause 3: the method of clause 1 or clause 2, wherein detecting the keypoints on each of the aircraft images includes generating the keypoints in a two-dimensional (2D) pixel space.

Clause 4: the method of clause 3, further comprising converting, via the aircraft controller using a Perspective-and-Point (PnP) iterative model, the keypoints in the 2D pixel space to a set of three-dimensional (3D) keypoints in a 3D coordinate space and mapped onto a 3D model of the receiver aircraft.

Clause 5: the method of clause 4, further comprising: determining a set of six-degrees-of-freedom (6DoF) values for each of the aircraft images using the prior image preceding the aircraft image in the time-series of images, the set of 6DoF values including estimated velocity and acceleration values; and determining an aircraft-calibrated flight envelope corresponding to the aircraft type of the receiver aircraft, the aircraft-calibrated flight envelope including predefined maximum velocity and acceleration values.

Clause 6: the method of clause 5, further comprising: comparing the estimated velocity and acceleration values to the predefined maximum velocity and acceleration values to determine if the set of 6DoF values are within the aircraft-calibrated flight envelope; and commanding, via the aircraft controller in response to a determination that the set of 6DoF values are not within the aircraft-calibrated flight envelope, movement of the refueling boom to a stowed state.

Clause 7: the method of any one of clauses 4 to 6, further comprising labelling, via the aircraft controller using the PnP iterative model, each of the keypoints in each of the aircraft images as either an inlier or an outlier, wherein each of the keypoints is labelled as the outlier when, based on a best fit analysis, the keypoint has a worse fit to the 3D model of the receiver aircraft than other ones of the keypoints.

Clause 8: the method of any one of clauses 1 to 7, wherein determining the respective keypoint rates of change for the keypoints in each of the aircraft images includes: determining a temporal offset between the aircraft images in the time-series of images; and determining, using the temporal offset, a respective velocity and acceleration for each of the keypoints in each of the aircraft images.

Clause 9: the method of any one of clauses 1 to 8, wherein estimating the respective predicted keypoint locations for the keypoints in each of the aircraft images includes: identifying, for each of the keypoints in the aircraft image, a corresponding keypoint in the prior image preceding the aircraft image in the time-series of images; and calculating, using a kinematic displacement equation, the respective predicted keypoint location for each of the keypoints in the aircraft image as a function of the respective keypoint rate of change and the corresponding keypoint.

Clause 10: the method of any one of clauses 1 to 9, wherein determining the system confidence value includes calculating an object keypoint similarity OKS as:

$$OKS = e^{-\frac{d_i^2}{2s^2 k_i^2}}$$

where $d_i$ is a Euclidean distance between a temporally predicted keypoint and a KP-predicted keypoint; s is a scalar for an area of a bounding box in the aircraft image divided by a total image area of the aircraft image; and k is a per-keypoint constant that controls fall off.

Clause 11: the method of any one of clauses 1 to 10, wherein determining the system confidence value includes calculating a pixel space error and a cartesian space error.

Clause 12: the method of any one of clauses 1 to 11, wherein the predefined keypoint locations are unique to the aircraft type of the receiver aircraft and include an aircraft engine keypoint, an aircraft nose cone keypoint, and an aircraft fuel port.

Clause 13: a non-transitory, computer-readable medium storing instructions executable by one or more processors of an aircraft controller of an aerial refueling aircraft, the aerial refueling aircraft including a refueling boom and a camera system with one or more digital cameras, the instructions, when executed by the one or more processors, causing the aircraft controller to perform operations comprising: receiving, from the camera system, a time-series of images of a receiver aircraft; determining, using the time-series of images, an aircraft type of the receiver aircraft and predefined keypoint locations corresponding to the aircraft type; detecting, on each aircraft image in the time-series of images using a position estimation machine learning (ML) algorithm, keypoints at the predefined keypoint locations on the receiver aircraft in the aircraft image; determining keypoint rates of change for the keypoints in each of the aircraft images by comparing each of the keypoints to a corresponding keypoint in a prior image immediately preceding the aircraft image in the time-series of images; estimating, using the keypoint rates of change, predicted keypoint locations for the keypoints in each of the aircraft images; determining, via the aircraft controller, a system confidence value by comparing the keypoints in each of the aircraft images with the predicted keypoint locations corresponding to the aircraft image; determining if the system confidence value is greater than a threshold confidence value; and commanding, in response to determining the system confidence value is greater than the threshold confidence value, movement of the refueling boom in accordance with a predefined boom control protocol.

Clause 14: an aircraft comprising: an airframe; a rotor assembly and/or a pair of wings attached to the airframe; a camera system with one or more digital cameras attached to the airframe; a refueling system including a fuel tank and a refueling boom attached to the airframe; and an aircraft controller communicatively connected to the camera system and the refueling system, the aircraft controller programmed to: receive a time-series of images of a receiver aircraft; determine, using the time-series of images, an aircraft type of the receiver aircraft and predefined keypoint locations corresponding to the aircraft type; detect, on each aircraft image in the time-series of images using a position estimation machine learning (ML) algorithm, keypoints at the predefined keypoint locations on the receiver aircraft in the aircraft image; determine keypoint rates of change for the keypoints in each of the aircraft images by comparing each of the keypoints to a corresponding keypoint in a prior image immediately preceding the aircraft image in the time-series of images; estimate, using the keypoint rates of change, predicted keypoint locations for the keypoints in each of the aircraft images; determine a system confidence value by comparing the keypoints in each of the aircraft images with the predicted keypoint locations corresponding to the aircraft image; and in response to a determination that the system confidence value is greater than a threshold confidence value, control movement of the refueling boom according to a predefined boom control protocol.

Clause 15: the aircraft of clause 14, wherein the aircraft controller is further programmed to command movement of the refueling boom to a stowed state in response to a determination that the system confidence value is not greater than the threshold confidence value.

Clause 16: the aircraft of clause 14 or clause 15, wherein detecting the keypoints on each of the aircraft images to place includes: generating the keypoints in a two-dimensional pixel space; and converting, using a Perspective-and-Point iterative model, the keypoints in the 2D pixel space to a set of three-dimensional keypoints in a 3D coordinate space and mapped onto a 3D model of the receiver aircraft.

Clause 17: the aircraft of any one of clauses 14 to 16, wherein the aircraft controller is further programmed to: determine a set of six-degrees-of-freedom (6DoF) values for each of the aircraft images using the prior image preceding the aircraft image in the time-series of images, the set of 6DoF values including estimated velocity and acceleration values; and determine an aircraft-calibrated flight envelope corresponding to the aircraft type of the receiver aircraft, the aircraft-calibrated flight envelope including predefined maximum velocity and acceleration values.

Clause 18: the aircraft of clause 17, wherein the aircraft controller is further programmed to: compare the estimated velocity and acceleration values to the predefined maximum velocity and acceleration values to determine if the set of 6DoF values are within the aircraft-calibrated flight envelope; and in response to a determination that the set of 6DoF values are not within the aircraft-calibrated flight envelope, command movement of the refueling boom to a stowed state.

Clause 19: the aircraft of any one of clauses 14 to 18, wherein determining the respective keypoint rates of change for the keypoints in each of the aircraft images includes: determining a temporal offset between the aircraft images in the time-series of images; and determining, using the temporal offset, a respective velocity and acceleration for each of the keypoints in each of the aircraft images.

Clause 20: the aircraft of any one of clauses 14 to 19, wherein determining the system confidence value includes calculating an object keypoint similarity OKS as:

$$OKS = e^{-\frac{d_i^2}{2s^2k_i^2}}$$

where $d_i$ is a Euclidean distance between a temporally predicted keypoint and a KP-predicted keypoint; s is a scalar for an area of a bounding box in the aircraft image divided by a total image area of the aircraft image; and k is a per-keypoint constant that controls fall off.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of operating an aerial refueling aircraft having a refueling boom and a camera system, the method comprising:
   receiving, via an aircraft controller from the camera system, a time-series of images of a receiver aircraft;
   determining, via the aircraft controller using the time-series of images, an aircraft type of the receiver aircraft and predefined keypoint locations corresponding to the aircraft type;
   detecting, on each aircraft image in the time-series of images via the aircraft controller using a position estimation machine learning (ML) algorithm, keypoints at the predefined keypoint locations on the receiver aircraft in the aircraft image;
   determining, via the aircraft controller, keypoint rates of change for the keypoints in each of the aircraft images by comparing each of the keypoints to a corresponding keypoint in a prior image immediately preceding the aircraft image in the time-series of images;

estimating, via the aircraft controller using the keypoint rates of change, predicted keypoint locations for the keypoints in each of the aircraft images;

determining, via the aircraft controller, a system confidence value by comparing the keypoints in each of the aircraft images with the predicted keypoint locations corresponding to the aircraft image;

commanding, via the aircraft controller in response to a determination that the system confidence value is greater than a threshold confidence value, movement of the refueling boom in accordance with a predefined boom control protocol; and commanding, via the aircraft controller in response to a determination that the system confidence value is not greater than the threshold confidence value, movement of the refueling boom to a stowed state.

2. The method of claim 1, wherein detecting the keypoints on each of the aircraft images includes generating the keypoints in a two-dimensional (2D) pixel space.

3. The method of claim 2, further comprising converting, via the aircraft controller using a Perspective-and-Point (PnP) iterative model, the keypoints in the 2D pixel space to a set of three-dimensional (3D) keypoints in a 3D coordinate space and mapped onto a 3D model of the receiver aircraft.

4. The method of claim 3, further comprising:

determining a set of six-degrees-of-freedom (6DoF) values for each of the aircraft images using the prior image preceding the aircraft image in the time-series of images, the set of 6DoF values including estimated velocity and acceleration values; and determining an aircraft-calibrated flight envelope corresponding to the aircraft type of the receiver aircraft, the aircraft-calibrated flight envelope including predefined maximum velocity and acceleration values.

5. The method of claim 4, further comprising:

comparing the estimated velocity and acceleration values to the predefined maximum velocity and acceleration values to determine if the set of 6DoF values are within the aircraft-calibrated flight envelope; and commanding, via the aircraft controller in response to a determination that the set of 6DoF values are not within the aircraft-calibrated flight envelope, movement of the refueling boom to the stowed state.

6. The method of claim 3, further comprising labelling, via the aircraft controller using the PnP iterative model, each of the keypoints in each of the aircraft images as either an inlier or an outlier, wherein each of the keypoints is labelled as the outlier when, based on a best fit analysis, the keypoint has a worse fit to the 3D model of the receiver aircraft than other ones of the keypoints.

7. The method of claim 1, wherein determining the respective keypoint rates of change for the keypoints in each of the aircraft images includes:

determining a temporal offset between the aircraft images in the time-series of images; and determining, using the temporal offset, a respective velocity and acceleration for each of the keypoints in each of the aircraft images.

8. The method of claim 1, wherein estimating the respective predicted keypoint locations for the keypoints in each of the aircraft images includes:

identifying, for each of the keypoints in the aircraft image, a corresponding keypoint in the prior image preceding the aircraft image in the time-series of images; and calculating, using a kinematic displacement equation, the respective predicted keypoint location for each of the keypoints in the aircraft image as a function of the respective keypoint rate of change and the corresponding keypoint.

9. The method of claim 1, wherein determining the system confidence value includes calculating an object keypoint similarity (OKS) as:

$$OKS = e^{-\frac{d_i^2}{2s^2 k_i^2}}$$

where $d_i$ is a Euclidean distance between a temporally predicted keypoint and a KP-predicted keypoint; s is a scalar for an area of a bounding box in the aircraft image divided by a total image area of the aircraft image; and k is a per-keypoint constant that controls fall off.

10. The method of claim 1, wherein determining the system confidence value includes calculating a pixel space error and a cartesian space error.

11. The method of claim 1, wherein the predefined keypoint locations are unique to the aircraft type of the receiver aircraft and include an aircraft engine keypoint, an aircraft nose cone keypoint, and an aircraft fuel port.

12. A non-transitory, computer-readable medium storing instructions executable by one or more processors of an aircraft controller of an aerial refueling aircraft, the aerial refueling aircraft including a refueling boom and a camera system with one or more digital cameras, the instructions, when executed by the one or more processors, causing the aircraft controller to perform operations comprising:

receiving, from the camera system, a time-series of images of a receiver aircraft;

determining, using the time-series of images, an aircraft type of the receiver aircraft and predefined keypoint locations corresponding to the aircraft type;

detecting, on each aircraft image in the time-series of images using a position estimation machine learning (ML) algorithm, keypoints at the predefined keypoint locations on the receiver aircraft in the aircraft image;

determining keypoint rates of change for the keypoints in each of the aircraft images by comparing each of the keypoints to a corresponding keypoint in a prior image immediately preceding the aircraft image in the time-series of images;

estimating, using the keypoint rates of change, predicted keypoint locations for the keypoints in each of the aircraft images;

determining, via the aircraft controller, a system confidence value by comparing the keypoints in each of the aircraft images with the predicted keypoint locations corresponding to the aircraft image;

determining if the system confidence value is greater than a threshold confidence value;

commanding, via the aircraft controller in response to a determination that the system confidence value is greater than a threshold confidence value, movement of the refueling boom in accordance with a predefined boom control protocol; and commanding, via the aircraft controller in response to a determination that the system confidence value is not greater than the threshold confidence value, movement of the refueling boom to a stowed state.

13. An aircraft comprising:

an airframe;

a rotor assembly and/or a pair of wings attached to the airframe;

a camera system with one or more digital cameras attached to the airframe;

a refueling system including a fuel tank and a refueling boom attached to the airframe; and an aircraft controller communicatively connected to the camera system and the refueling system, the aircraft controller being programmed to:

receive a time-series of images of a receiver aircraft from the camera system;

determine, using the time-series of images, an aircraft type of the receiver aircraft and predefined keypoint locations corresponding to the aircraft type;

detect, on each aircraft image in the time-series of images using a position estimation machine learning (ML) algorithm, keypoints at the predefined keypoint locations on the receiver aircraft in the aircraft image;

determine keypoint rates of change for the keypoints in each of the aircraft images by comparing each of the keypoints to a corresponding keypoint in a prior image immediately preceding the aircraft image in the time-series of images;

estimate, using the keypoint rates of change, predicted keypoint locations for the keypoints in each of the aircraft images;

determine a system confidence value by comparing the keypoints in each of the aircraft images with the predicted keypoint locations corresponding to the aircraft image;

in response to a determination that the system confidence value is greater than a threshold confidence value, control movement of the refueling boom in accordance with a predefined boom control protocol; and in response to a determination that the system confidence value is not greater than the threshold confidence value, control movement of the refueling boom to a stowed state.

14. The aircraft of claim 13, wherein detecting the keypoints on each of the aircraft images includes:

generating the keypoints in a two-dimensional (2D) pixel space; and converting, using a Perspective-and-Point (PnP) iterative model, the keypoints in the 2D pixel space to a set of three-dimensional (3D) keypoints in a 3D coordinate space and mapped onto a 3D model of the receiver aircraft.

15. The aircraft of claim 13, wherein the aircraft controller is further programmed to:

determine a set of six-degrees-of-freedom (6DoF) values for each of the aircraft images using the prior image preceding the aircraft image in the time-series of images, the set of 6DoF values including estimated velocity and acceleration values; and determine an aircraft-calibrated flight envelope corresponding to the aircraft type of the receiver aircraft, the aircraft-calibrated flight envelope including predefined maximum velocity and acceleration values.

16. The aircraft of claim 15, wherein the aircraft controller is further programmed to:

compare the estimated velocity and acceleration values to the predefined maximum velocity and acceleration values to determine if the set of rate values are within the aircraft-calibrated flight envelope; and in response to a determination that the set of rate values are not within the aircraft-calibrated flight envelope, command movement of the refueling boom to the stowed state.

17. The aircraft of claim 13, wherein determining the respective keypoint rates of change for the keypoints in each of the aircraft images includes:

determining a temporal offset between the aircraft images in the time-series of images; and determining, using the temporal offset, a respective velocity and acceleration for each of the keypoints in each of the aircraft images.

18. The aircraft of claim 13, wherein determining the system confidence value includes calculating an object keypoint similarity (OKS) as:

$$OKS = e^{-\frac{d_i^2}{2s^2 k_i^2}}$$

where $d_i$ is a Euclidean distance between a temporally predicted keypoint and a KP-predicted keypoint; s is a scalar for an area of a bounding box in the aircraft image divided by a total image area of the aircraft image; and k is a per-keypoint constant that controls fall off.

19. The aircraft of claim 14, the aircraft controller being further programmed to:

label, using the PnP iterative model, each of the keypoints in each of the aircraft images as either an inlier or an outlier, wherein each of the keypoints is labelled as the outlier when, based on a best fit analysis, the keypoint has a worse fit to the 3D model of the receiver aircraft than other ones of the keypoints.

20. The aircraft of claim 13, wherein estimating the respective predicted keypoint locations for the keypoints in each of the aircraft images includes:

identifying, for each of the keypoints in the aircraft image, a corresponding keypoint in the prior image preceding the aircraft image in the time-series of images; and calculating, using a kinematic displacement equation, the respective predicted keypoint location for each of the keypoints in the aircraft image as a function of the respective keypoint rate of change and the corresponding keypoint.

* * * * *